April 2, 1974     D. E. GILBERT     3,801,690
CLOSING MOLD HALVES ON STRETCHED PORTION OF INDIVIDUAL
PARISON PREFORM AT ORIENTATION TEMPERATURE
Original Filed Nov. 26, 1969     2 Sheets-Sheet 1

INVENTOR.
D. E. GILBERT

BY

*Young + Quigg*

ATTORNEYS

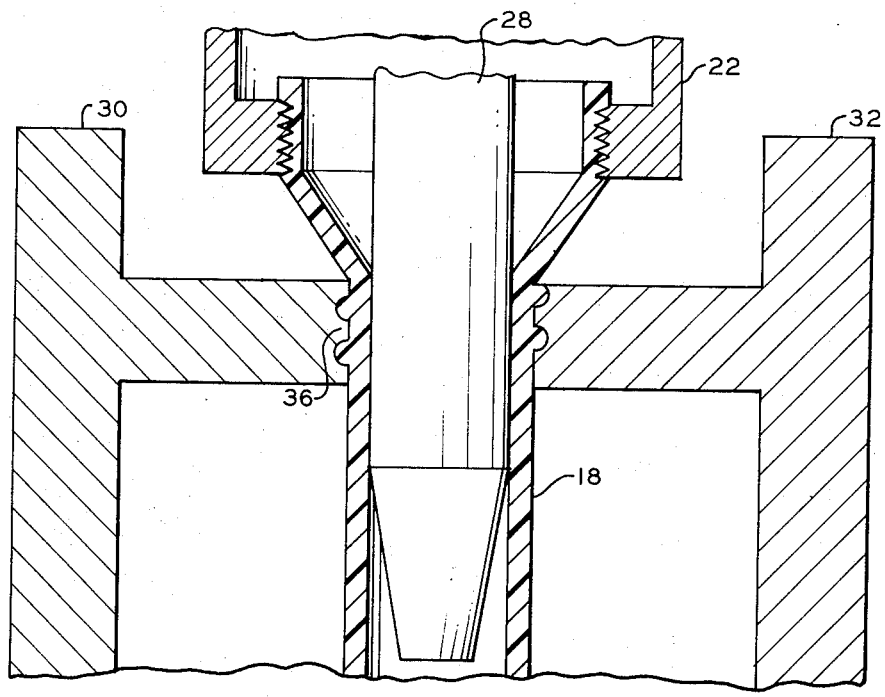
FIG. 4
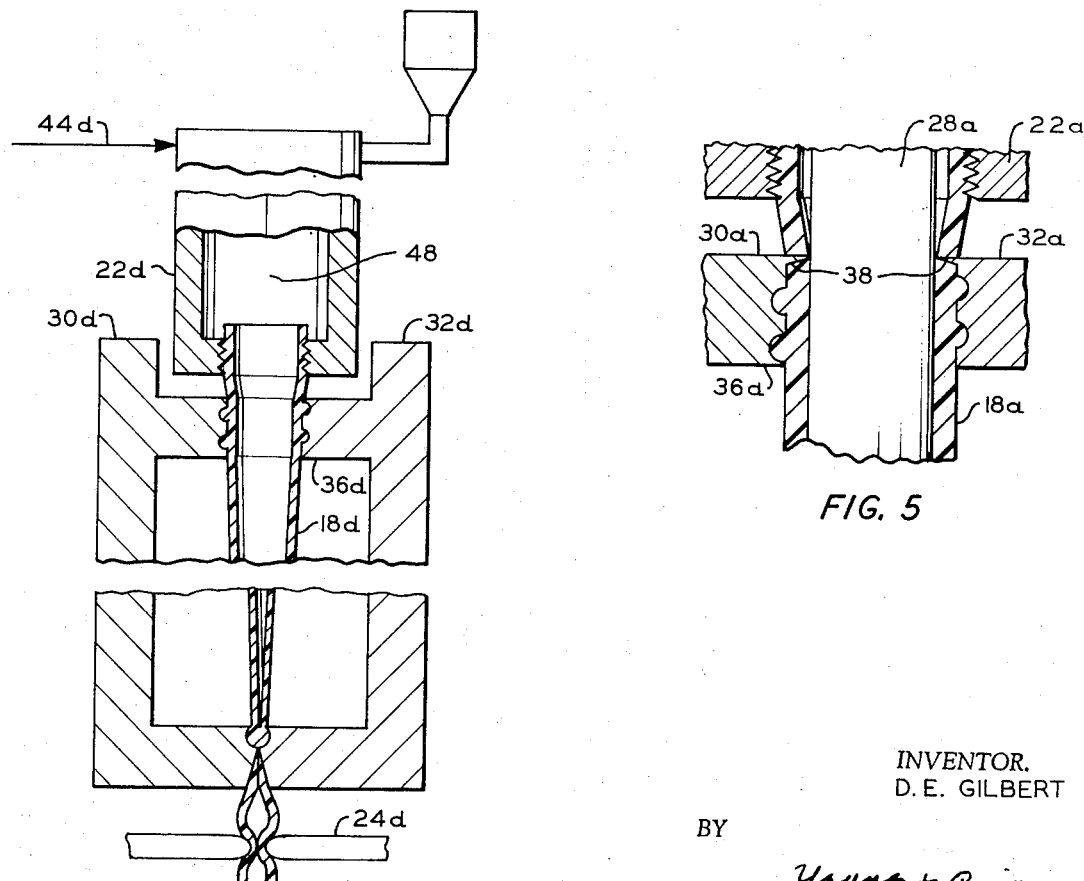
FIG. 5
FIG. 8
INVENTOR.
D. E. GILBERT
BY
Young & Quigg
ATTORNEYS

United States Patent Office 3,801,690
Patented Apr. 2, 1974

3,801,690
CLOSING MOLD HALVES ON STRETCHED PORTION OF INDIVIDUAL PARISON PREFORM AT ORIENTATION TEMPERATURE
Dixie E. Gilbert, Orangeburg, N.Y., assignor to
Phillips Petroleum Company
Continuation of abandoned application Ser. No. 880,329, Nov. 26, 1969. This application Feb. 16, 1972, Ser. No. 226,941
Int. Cl. B89c 17/07
U.S. Cl. 264—99
7 Claims

ABSTRACT OF THE DISCLOSURE

In a process for blow molding biaxially oriented hollow articles from tubular parisons, said parison is stretched axially and thereafter mold halves are closed on said thus stretched parisons; a portion of said thus stretched parison adjacent one end can be expanded out into conformity with a neck-forming zone; the other end can be sealed and severed by said mold halves.

CROSS REFERENCE TO RELATED APPLICATIONS

This is a continuation of copending application Ser. No. 880,329, filed Nov. 26, 1969 now abandoned.

BACKGROUND OF THE INVENTION

This invention relates to forming hollow articles by blow molding a thermoplastic parison at the orientation temperature of said thermoplastic.

Patents in the blow molding art go back over 100 years, however, it has only been in the last dozen years or so that this technique has achieved significant commercial success. Very recently, techniques have been developed for forming biaxially oriented hollow articles utilizing a technique wherein a parison is fabricated at orientation temperature. Such techniques are disclosed in Wiley, U.S. 3,288,317, and Turner et al., U.S. 3,390,426, for instance. The techniques disclosed in said Wiley and Turner et al. patents make possible the production of articles having very desirable properties, which properties cannot be obtained in conventional processes. However, by virtue of the fact that the parison is at orientation temperature during the fabrication process, many manipulative operations which are easily carried out on a thoroughly molten parison are not feasible utilizing this technique.

One particularly difficult problem is to produce large containers with standard size thread areas. This is because if a small parison is used so as to give a small neck and thread area, the walls of the parison will be thinned unduly on expansion to conform to the shape of the mold. Conversely, if a parison is utilized which has sufficient polymer to form walls of a relatively large article, the diameter of the thread and neck area will be too large.

SUMMARY OF THE INVENTION

It is an object of this invention to provide an improved process for forming biaxially oriented hollow articles; and It is a further object of this invention to produce large biaxially oriented containers having small neck and thread areas.

In accordance with this invention, mold halves are closed on an open end parison preform at orientation temperature after said parison has been stretched in the axial direction.

BRIEF DESCRIPTION OF THE DRAWINGS

In the drawings, forming a part hereof, wherein like reference characters denote like parts in the various views, FIG. 4 is a view similar to FIG. 3 at a still later stage in the operation; FIG. 5 is a cross-sectional view similar to FIG. 3, showing an alternative embodiment of the invention; FIG. 8 is a view similar to FIG. 3 of another alternative embodiment of the invention.

DESCRIPTION OF THE PREFERRED EMBODIMENTS

This invention is applicable to the formation of any article having biaxial molecular orientation and a relatively small neck and/or thread area compared with the body portion of said article.

The invention is applicable for the production of these articles from any orientable thermoplastic resin. Exemplary resins include polyolefins, poly(vinyl chlorides), acrylonitrile-butadiene-styrene polymers, styrene-butadiene copolymers, various styrene polymers and copolymers, polyamides, polyvinylidene chloride polymers and copolymers, and the like. Preferred resins include crystalline polymers such as polymers of at least one mono-1-olefin having 2–8 carbon atoms per molecule, more preferably, polymers and copolymers of ethylene, propylene, and 1-butene, with polypropylene being especially preferred.

The thermoplastic is first extruded or molded into parison preforms and cooled to solidify same. The parisons are then heated to orientation temperature, which in the case of olefin polymers, is generally about 1–50, preferably 5–25° F., below the crystalline melting temperature. The crystalline melting temperature can be determined by placing a small sample of the material to be tested on a heating stage of a polarizing microscope and recording the crystalline melting point as that temperature at which the last birefringence disappears on slow heating. The parison preforms can be heated to this orientation temperature in an air oven, in a liquid bath, in a heating block, or by subjecting them to radiant heat or any other suitable means.

The instant invention is applicable to the formation of any article wherein the ratio of the maximum outside diameter of the body portion to the outside diameter of the thread and/or neck area is relatively large, preferably greater than about 2.6:1, more preferably within the range of 3.2:1 to 20:1.

The axial stretching prior to forming the threads in accordance with this invention must be in an amount such that the stretched to unstretched ratio of the parison is at least 1.2:1, preferably 1.2:1 to 8:1, more preferably 1.5:1 to 2.5:1. By stretch ratio is meant the ratio of the stretched to the unstretched length. A ratio of 2:1, for instance, would mean that the portion of the parison between the gripping jaws which is being stretched had an initial length before stretching of 5 inches and a length after stretching of 10 inches.

While the stretching, insertion of the plug, and expansion into conformity with the mold is generally carried out at ambient temperature, the sequence of steps is sufficiently rapid that the polymer remains at orientation temperature throughout the operation.

The plug can be made of any suitable material, such as Teflon, steel, or the like. A preferred material is Stellite.

Surprisingly, it has been found that the shrinkage of the material in the thread and/or neck area can be reduced by utilizing a plug having means to cool the interior thereof.

Figure 1:
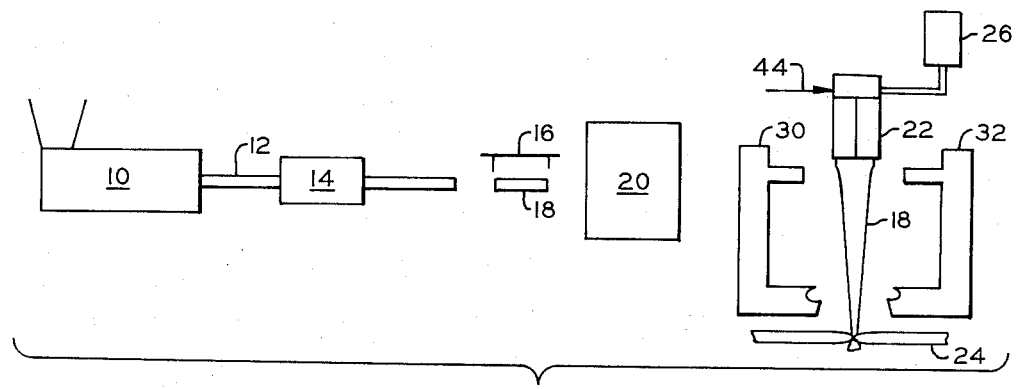
FIG. 1 is a schematic representation of a molding operation adapted to utilize the instant invention.

Referring now to the drawings, particularly FIG. 1, there is shown in schematic representation an operation employing the instant invention. Extrusion means 10 forms a tubular extrudate 12. Tubular extrudate 12 passes through vacuum sizing and quenching chamber 14 and thence to cutting mechanism 16 where it is severed into individual parison preforms 18. Individual parison preforms 18 are heated to orientation temperature in air oven 20. The thus heated parisons are grasped at a first end thereof by gripping jaws 22 and at the second end thereof by pinching fingers 24. Relative movement is effected between the two ends of the parison, for instance by means of raising gripping jaws 22 through the action of cylinder 26.

Figure 2:
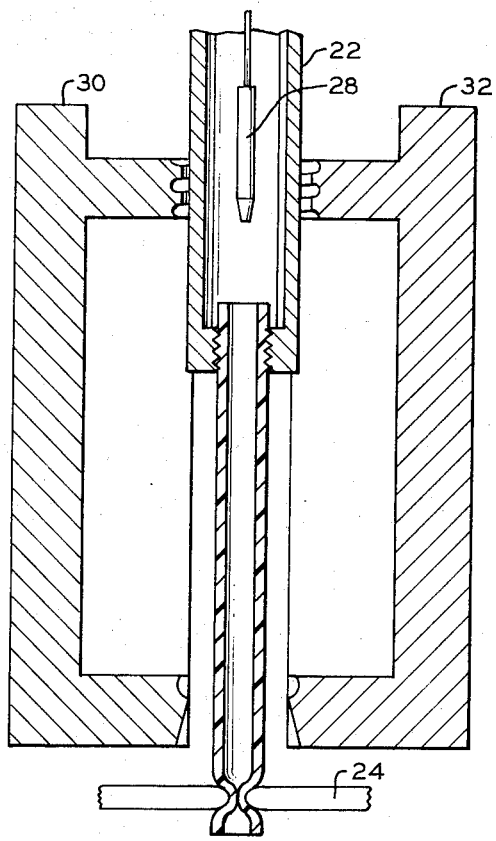
FIG. 2 is a detailed view in cross section of the mold and stretching means at an early stage in the operation.

Referring now to FIG. 2, the molding station of FIG. 1 is shown in cross section showing thread forming helper plug 28 which is coaxially carried with gripping jaws 22. As shown in FIG. 2, the operation is at the first stage prior to the initial axial stretching of the parison.

Figure 3:
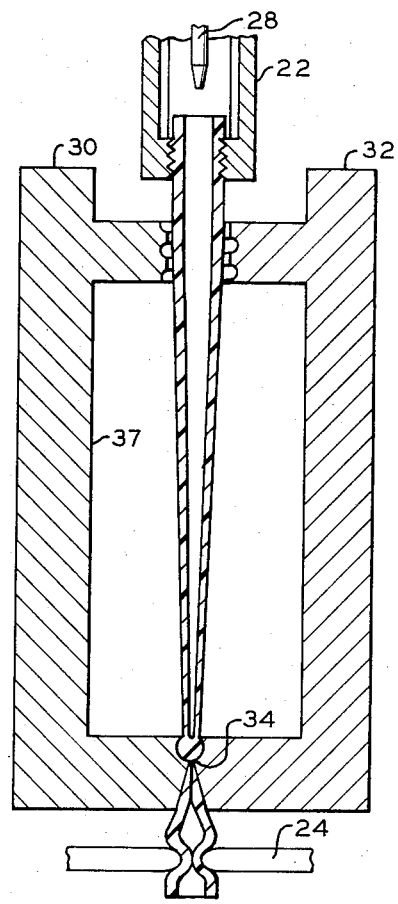
FIG. 3 is a view similar to FIG. 2 at a later stage in the operation.

In FIG. 3, there is shown the operation at a later stage wherein the mold halves 30 and 32 have closed on the parison after stretching. The parison is sealed and severed at a lower end thereof by means of forwardmost sections 34 of mold halves 30 and 32.

In FIG. 4, there is shown the next step of the sequence wherein plug 28 has been inserted into the interior of parison 18 to expand same out into intimate conformity with the thread forming portion 36 of mold halves 30 and 32. In the next stage in the sequence (not shown), the bulk of the parison is expanded out against the body forming zone 37 of the mold to form the finished article.

FIG. 5 shows an alternative embodiment of the invention wherein parison 18a is held by gripping jaws 22a. Plug 28a is inserted into the interior of the parison after said parison has been axially stretched and thereafter, mold halves 30a and 32a are closed to press said parison against said plug to form the threads by means of thread forming portions 36a of the mold halves. In this embodiment, thread forming portions 36a have leading knife edges 38 which sever the parison to make a clean cut along the area which will become the top lip of the bottle. The thread forming portion 36a can also be contoured in this area in a manner to form a pouring lip, in addition to forming threads and/or lugs and the like.

Figure 6:
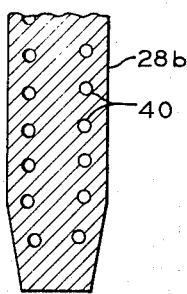
FIG. 6 is a cross-sectional view of a plug in accordance with an alternative embodiment of the invention.
Figure 7:
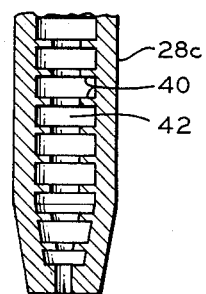
FIG. 7 is a cross-sectional view similar to FIG. 6 of a plug in accordance with another alternative embodiment of the invention.

FIGS. 6 and 7 show cross-sectional views of plugs 28b and 28c, respectively, which are designed to allow internal cooling of the plug so as to obtain better dimensional control of the parison in the thread area. Plug 28b has channels 40 for circulating a cooling fluid such as water. Plug 28c has fins 40 to provide a greater surface area for dissipating heat to the air cavity 42.

After the parison has been axially stretched thus decreasing its diameter and threads formed in the reduced diameter section adjacent one end, the parison is expanded out into conformity with the mold wall by the introduction of fluid pressure by line 44 (FIG. 1). This air can be introduced, for instance, by means of a channel through the center of the plug, terminating in an orifice such as orifice 46 in plug 28c as shown in FIG. 7.

In FIG. 8 there is shown another alternative embodiment of the invention wherein the parison 18d is grasped at first and second ends thereof by means of gripping jaws 22d and pinching fingers 24d and stretched as in the other embodiments. After mold halves 30d and 3d close about said thus stretched parison, fluid pressure is introduced through line 44d, which fluid passes through chamber 48, defined by gripping jaw means 22d and thence into the interior of the parison where the stretched parison is expanded out into conformity with the mold walls in general, and in addition, is caused to conform to the configuration of thread forming portion 36d by means of this internal fluid pressure. Surprisingly, it has been found that in a parison at orientation temperature which has been stretched, it is possible to form threads simply by means of the introduction of internal fluid pressure. The pressure used can be that normally used in blow molding operations. For instance, air at a pressure of 60–300 p.s.i.g., preferably 90–200 p.s.i.g. is satisfactory. Thus, operation in accordance with this embodiment of the invention provides the double advantage of allowing the formation of a large article from having a small neck and the formation of the thread area without the necessity for extra mechanical members required for inserting a plug, both of these beneficial results flowing from stretching the parison prior to forming the thread area Many conventional parts such as temperature controllers, frame members, mechanical elements, and the like have not been included for the sake of simplicity, but their inclusion is understood by those skilled in the art and is within the scope of the invention.

EXAMPLE I

Propylene homopolymer having a density of 0.905 (ASTM D 1505–63T), a melt index of 2 (ASTM D1238–62T, Condition L), and a crystalline melting point of about 340° F. was extruded into tubing having an outside diameter of 33 millimeters and a wall thickness of about 0.15 inch. This tubing was cooled to room temperature, cut into 5-inch lengths, and reheated to about 320° F. Such heated parison was grasped at a lower end thereof by pinching fingers such as those shown in the drawings, and at the other end thereof by gripping jaws such as those shown in the drawings. The parison was then stretched to 200% of its original length and a mold closed about the parison, which mold had a thread forming section adapted to form threads having an outside diameter of about 24 millimeters. Thereafter a plug was inserted into the parison as shown in FIG. 4 of the drawings, and internal fluid pressure introduced to expand same out into conformity with the mold. The particular article being molded had a diameter in the body portion of 2½ inches (63.5 mm.).

EXAMPLE II

Similar bottles were made in an identical manner to that described in Example I, except that the outside diameter of the thread area in the finished bottle was approximately 20 millimeters to give a ratio of diameter of body portion to the diameter of the final neck portion of greater than 3:1 (3.175:1 in this example).

While this invention has been described in detail for the purpose of illustration, it is not to be construed as limited thereby, but is intended to cover all changes and modifications within the spirit and scope thereof.

I claim:

1. A method of forming a biaxially oriented hollow article having a threaded neck portion and a body portion which is relatively large compared with said threaded neck portion said method comprising:

heating a tubular thermoplastic parison which is open at both ends to orientation temperature; grasping each end of said thus heated parison and longitudinally stretching said thus heated parison, said stretching being such that the ratio of stretched to unstretched length is within the range of 1.2:1 to 8:1; and one end of said parison remaining open during said grasping and stretching;

thereafter closing mold halves on said thus stretched parison while said parison remains at orientation temperature; sealing and severing said parison adjacent the end opposite said open one end thereof by leading edges of said mold halves as said mold halves close on said thus stretched parison;

thereafter introducing an internal plug through said open one end to expand a portion of said thus stretched parison out into conformity with a neck-forming zone; and expanding the bulk of said parison out into conformity with a body-forming zone.

2. The method according to claim 1 wherein said parison comprises a polymer of at least one mono-1-olefin having 2–8 carbon atoms per molecule and said parison is heated to an orientation temperature of 1–50° F. below the crystalline melting point thereof.

3. The method according to claim 1 wherein said parison comprises polypropylene and said parison is heated to an orientation temperature of 1–50° F. below the crystalline melting point thereof.

4. The method according to claim 1 wherein said parison is formed by continuous extrusion of a length of tubing which length is thereafter cooled to room temperature, severed into individual work pieces, and reheated.

5. The method according to claim 1 wherein said neck-forming zone comprises a thread-forming zone.

6. The method according to claim 1 wherein the ratio of an outside diameter of said body portion to an outside diameter of said neck portion of the finished article is greater than 3:1.

7. The method according to claim 1 wherein said plug is cooled.

References Cited
UNITED STATES PATENTS

| | | | |
|---|---|---|---|
| 3,390,426 | 7/1968 | Turner et al. | 264—99 UX |
| 2,515,093 | 7/1950 | Mills | 264—98 X |
| 3,202,739 | 8/1965 | Zavasnik | 264—98 |
| 3,288,317 | 11/1966 | Wiley | 215—1 |
| 3,304,357 | 2/1967 | Langecker | 264—98 X |
| 3,504,397 | 4/1970 | Langecker | 264—98 X |
| 2,919,462 | 1/1960 | Friden | 264—99 |

ROBERT F. WHITE, Primary Examiner

J. H. SILBAUGH, Assistant Examiner

U.S. Cl. X.R.

425—Dig. 216